No. 661,811. Patented Nov. 13, 1900.
A. J. McCREADY.
VINE CUTTER.
(Application filed Sept. 19, 1900.)
(No Model.)
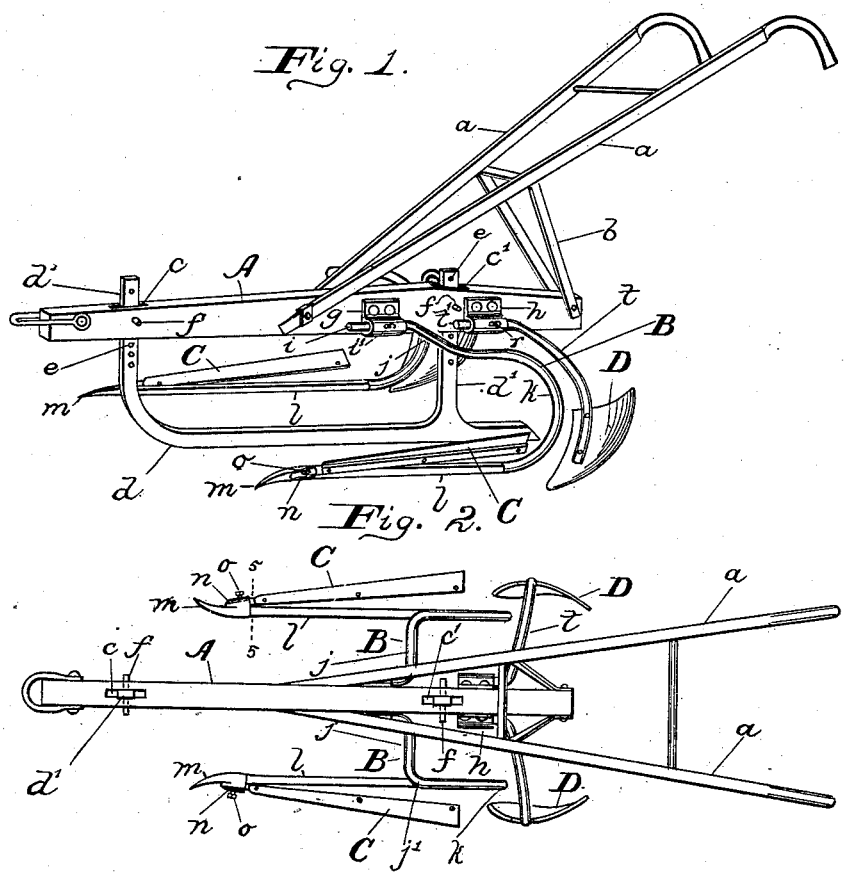
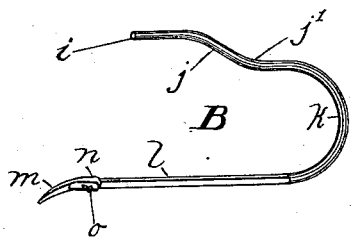
Witnesses.
H. F. Meyer Jr.
F. S. Stitt.
Inventor.
Andrew J. McCrady
By Chas. B. Mann
Attorney.

UNITED STATES PATENT OFFICE.

ANDREW J. McCREADY, OF LEEMONT, VIRGINIA.

VINE-CUTTER.

SPECIFICATION forming part of Letters Patent No. 661,811, dated November 13, 1900.

Application filed September 19, 1900. Serial No. 30,460. (No model.)

*To all whom it may concern:*

Be it known that I, ANDREW J. MCCREADY, a citizen of the United States, residing at Leemont, in the county of Accomack and State of Virginia, have invented certain new and useful Improvements in Vine-Cutters, of which the following is a specification.

My invention is an improvement in agricultural implements for cutting such vines as grow along the ground, particularly potato-vines; and its object is to provide a construction of vine-cutter in which the height of the beam with respect to the runner may be regulated, in which the cutting-blades may be readily adjusted axially, so as to change the inclination of the blades more or less, and in which the arms which carry the cutting-blades may be elevated or lowered, when desired, in a simple and efficient manner.

The invention consists in certain constructions, arrangements, and combinations of the parts, which I shall hereinafter fully describe and claim.

Reference is to be had to the accompanying drawings, in which—

Figure 1 is a perspective view of my improved vine-cutter. Fig. 2 is a top plan view thereof. Fig. 3 is a detail side view of one of the cutting-blades. Fig. 4 is a detail perspective view of one of the arms for carrying the cutting-blades. Fig. 5 is a transverse sectional view taken on the line 5 5 of Fig. 2.

Referring to the drawings, A designates the beam of the vine-cutter, provided with handles $a$, suitably braced by irons $b$, secured to the rear of the beam. Two vertical slots $c\ c'$ are formed in said beam, one near the front end and the other near the rear end thereof, and a U-shaped runner $d$ has its upwardly-extending ends $d'$ inserted through said slots $c\ c'$, and each end is provided with a plurality of apertures $e$, any one of which receives a pin $f$, inserted transversely through the beam across the vertical slots, whereby to secure the runner on the beam at any desired elevation or height. On each side of the beam A are secured two cylindrical bearings $g$ and $h$, the bearings $g$, which are opposite each other, being in advance of the bearings $h$, which are also opposite each other. On the forward bearings $g$ the arms B for carrying the cutting-blades are held, and in the rear bearings $h$ the shanks $t$ of the scrapers are held. Each cutting-blade arm B, as shown in Fig. 4, is provided with a forwardly-extending rounded upper end $i$, which is mounted in one of the forward bearings $g$, so as to turn therein, and is held adjusted by a set-screw $i'$. From said end the arm extends laterally in an outward direction, as shown at $j$, and then curves at $j'$ and extends rearwardly and curves downwardly, as at $k$, from which curved portion emanates a forwardly-extending lower end $l$, terminating in a downwardly and outwardly curved spur $m$, which takes under the vines and causes them to ride up on the cutting-blades. Immediately in the rear of the spur $m$ the said arm B is provided with a socket $n$, which extends slightly oblique to the forwardly-extending lower end $l$ of the arm, and in said socket is held by a set-screw $o$ the forward rounded shank $p$ of a cutting-blade C, which gradually tapers, being widened from its forward to its rear end, as shown in Fig. 3. The cutting edge is on the outer side. The cutting-blade has an adjustment in a swinging plane, due to the rounded end $i$ of its arm being turned in the bearing $g$. The set-screw $i'$ holds it fast. The cutting-blades may also have their inclination changed by turning their shanks $p$ in the socket $n$. In each of the rear bearings $h$ on the beam is adjustably held by a set-screw $r$ the forwardly-extending upper end $t'$ of a scraper-shank $t$. Said shank extends downwardly and outwardly from said upper end, and to the lower end of the shank is secured a scraper-blade D, which scrapes the vines cut by the blade C to the middle of the furrow between the rows of plants along which the implement moves.

In practical operation the vine-cutter is drawn along by its runner $d$, traversing the surface of the ground between the rows of potato-vines. The outwardly and downwardly curved spurs $m$ take under the vines and turn them up into engagement with the cutting-blades C, and then the scraper-blades D draw the cut vines into the middle of the furrow between the rows, so that they may be readily collected.

It is to be observed that the parts of my vine-cutter are capable of four distinct adjustments—to wit, an adjustment between the beam A and runner d, an adjustment of the vertically-swinging arms B, which carry the cutting-blades C, an axial or inclined adjustment of the cutting-blades C in their obliquely-disposed sockets n, and an adjustment of the scraper-shanks t independently of the cutting-blade arms B.

If the furrow between the rows in one field is deeper or shallower than in another, the beam A is raised or lowered on the runner without the necessity of changing the distance between the two cutting-blades and the two scraper-blades, which are set according to the distance between the rows. If the rows are farther apart or nearer together in one field than in another, the arms B are swung either upwardly or downwardly in their bearings g, and are held at the proper elevation by the set-screws i', while the elevation of the scraper-blades D is changed correspondingly, if necessary or desirable, and the cutting-blades are tilted or inclined axially in their sockets n, so as to bring their cutting edges in the proper plane to cut the vines, such adjustment being necessitated by the different elevations at which the arms are held.

It will thus be seen that I have provided a vine-cutter which is capable of doing effective work under varying conditions and which is strong and durable in construction and of comparatively few and simple parts.

Having thus described my invention, what I claim as new, and desire to secure by Letters Patent, is—

1. In a vine-cutter, the combination of a runner; a beam adjustably mounted on said runner; carrier-arms whose ends are held in bearings mounted on said beams so as to turn therein; and cutting-blades carried by said arms.

2. In a vine-cutter, the combination of a runner; a beam mounted on said runner; blade-carrier arms adjustably mounted on said beam; and cutting-blades axially adjustable on said arms so as to be tilted or inclined.

3. In a vine-cutter, the combination of a runner; a beam vertically adjustable on said runner; blade-carrier arms having their upper ends mounted on said beam with their lower ends capable of swinging; cutting-blades secured to the lower ends of said arms and adjustable independently thereon so as to be tilted or inclined more or less; and scraper-blades supported by said beam.

4. A vine-cutter, comprising a runner; a beam vertically adjustable on said runner; blade-carrier arms adjustably mounted on said beam; a cutting-blade adjustably secured to each arm; and scraper-shanks adjustably mounted on said beam and adjustable independently of the blade-arms and having scraper-blades secured thereto.

5. A vine-cutter, comprising a beam; means for supporting said beam; blade-carrier arms having their upper ends adjustably secured to said beam and provided at their lower ends with sockets and curved spurs projecting before said sockets; and cutting-blades having round shanks secured in said sockets and axially adjustable therein.

6. A vine-cutter comprising a U-shaped runner having a plurality of apertures in its upward-projecting ends; a beam provided with vertical slots in which said runner ends are inserted; pins inserted through said beam across said slots and through an aperture in each end of said runner; carrier-arms mounted on said beam; and cutting-blades carried by said arms.

7. A vine-cutter, comprising a beam provided with forward and rear cylindrical bearings; carrier-arms having rounded upper ends adjustably held in the forward bearings and provided at their lower ends with sockets and spurs curving outwardly and downwardly before said sockets; cutting-blades having round shanks axially adjustable in said sockets; scraper-shanks having their upper ends adjustably held in the said rear bearings; and scraper-blades secured to the lower ends of said shanks.

In testimony whereof I affix my signature in the presence of two witnesses.

ANDREW J. McCREADY.

Witnesses:
ROBERT H. PENNEWELL,
CHARLES B. MANN, Jr.